United States Patent
McPheeters et al.

(10) Patent No.: US 10,305,415 B2
(45) Date of Patent: May 28, 2019

(54) SOLAR PANEL INSTALLATION SYSTEMS AND METHODS

(71) Applicant: Sunrun South LLC, San Luis Obispo, CA (US)

(72) Inventors: Greg McPheeters, Santa Clara, CA (US); Geno Viscuso, Shingle Springs, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/819,398

(22) Filed: Aug. 5, 2015

(65) Prior Publication Data

US 2016/0043688 A1 Feb. 11, 2016

Related U.S. Application Data

(60) Provisional application No. 62/033,311, filed on Aug. 5, 2014, provisional application No. 62/075,607, filed (Continued)

(51) Int. Cl.
| | |
|---|---|
| *H02S 20/23* | (2014.01) |
| *F16B 2/06* | (2006.01) |
| *F16B 2/18* | (2006.01) |
| *F24S 25/61* | (2018.01) |
| *F24S 25/70* | (2018.01) |
| *H02S 20/30* | (2014.01) |

(Continued)

(52) U.S. Cl.
CPC ............. *H02S 20/23* (2014.12); *F16B 2/065* (2013.01); *F16B 2/185* (2013.01); *F24S 25/61* (2018.05); *F24S 25/70* (2018.05); *H02S 20/30* (2014.12); *H02S 30/10* (2014.12); *F24S 2025/6003* (2018.05); *F24S 2025/6008* (2018.05); *Y02B 10/12* (2013.01); *Y02B 10/20* (2013.01); *Y02E 10/47* (2013.01)

(58) Field of Classification Search
CPC .......... F24J 2/5203; F24J 2/526; F24J 2/5264; F24J 2002/4663; F24J 2002/4665; F24J 2002/0046; F24J 2002/5213; F24J 2/5207; F24J 2/5252; F24J 2/5256; F24J 2/5262; H02S 20/22; H02S 20/23; Y02B 10/12

See application file for complete search history.

(56) References Cited

U.S. PATENT DOCUMENTS

| | | |
|---|---|---|
| 5,556,222 A | 9/1996 | Chen |
| 6,017,008 A | 1/2000 | Farley |

(Continued)

OTHER PUBLICATIONS

Definition of "bore" provided by the Free Dictionary and found at http://www.thefreedictionary.com/bore.

*Primary Examiner* — Devina Pillay
*Assistant Examiner* — Daniel P Malley, Jr.
(74) *Attorney, Agent, or Firm* — Kramer Levin Naftalis & Frankel LLP

(57) ABSTRACT

Solar panel installation systems are disclosed that reduce or eliminate the need for large, costly rails for mounting solar panels on an installation surface. The systems may include an array of framed solar modules supported above an installation surface using a number of height-adjustable base members. Adjacent solar modules in the array may be coupled to one another at or near their corners using module links that can structurally couple the frames of the adjacent solar modules together.

10 Claims, 22 Drawing Sheets

Related U.S. Application Data on Nov. 5, 2014, provisional application No. 62/138,065, filed on Mar. 25, 2015, provisional application No. 62/187,995, filed on Jul. 2, 2015.

(51) Int. Cl.
*H02S 30/10* (2014.01)
*F24S 25/60* (2018.01)

(56) References Cited

U.S. PATENT DOCUMENTS

| | | |
|---|---|---|
| 6,277,069 B1 | 8/2001 | Gray |
| 7,314,331 B1 | 1/2008 | Koros et al. |
| 7,758,502 B2 | 7/2010 | Phillips et al. |
| 2009/0078299 A1 | 3/2009 | Cinnamon et al. |
| 2010/0313506 A1* | 12/2010 | Schoell ............... F24J 2/045 52/302.1 |
| 2011/0000519 A1* | 1/2011 | West ............... F24J 2/5211 136/244 |
| 2012/0097807 A1 | 4/2012 | Rees |
| 2012/0102853 A1 | 5/2012 | Rizzo |
| 2013/0011187 A1 | 1/2013 | Schuit et al. |
| 2013/0340358 A1* | 12/2013 | Danning ............... B23P 11/00 52/126.7 |
| 2014/0041706 A1 | 2/2014 | Haddock et al. |
| 2014/0202525 A1 | 7/2014 | Janssens et al. |
| 2014/0326838 A1* | 11/2014 | West ............... H02S 20/20 248/74.2 |
| 2015/0034355 A1* | 2/2015 | Patton ............... F24S 25/61 174/78 |
| 2016/0006390 A1* | 1/2016 | Cinnamon ............... H02S 20/23 248/237 |

\* cited by examiner

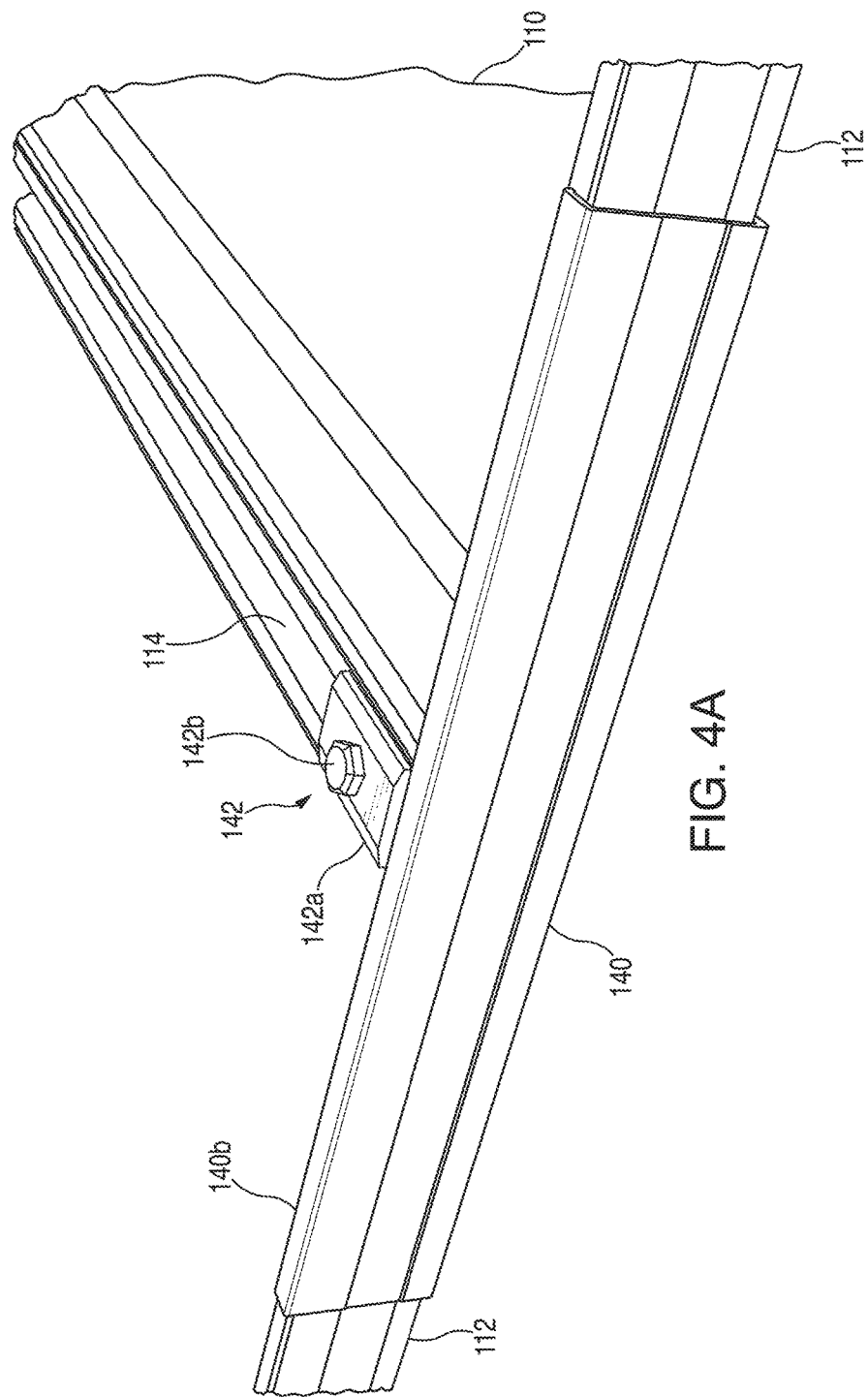

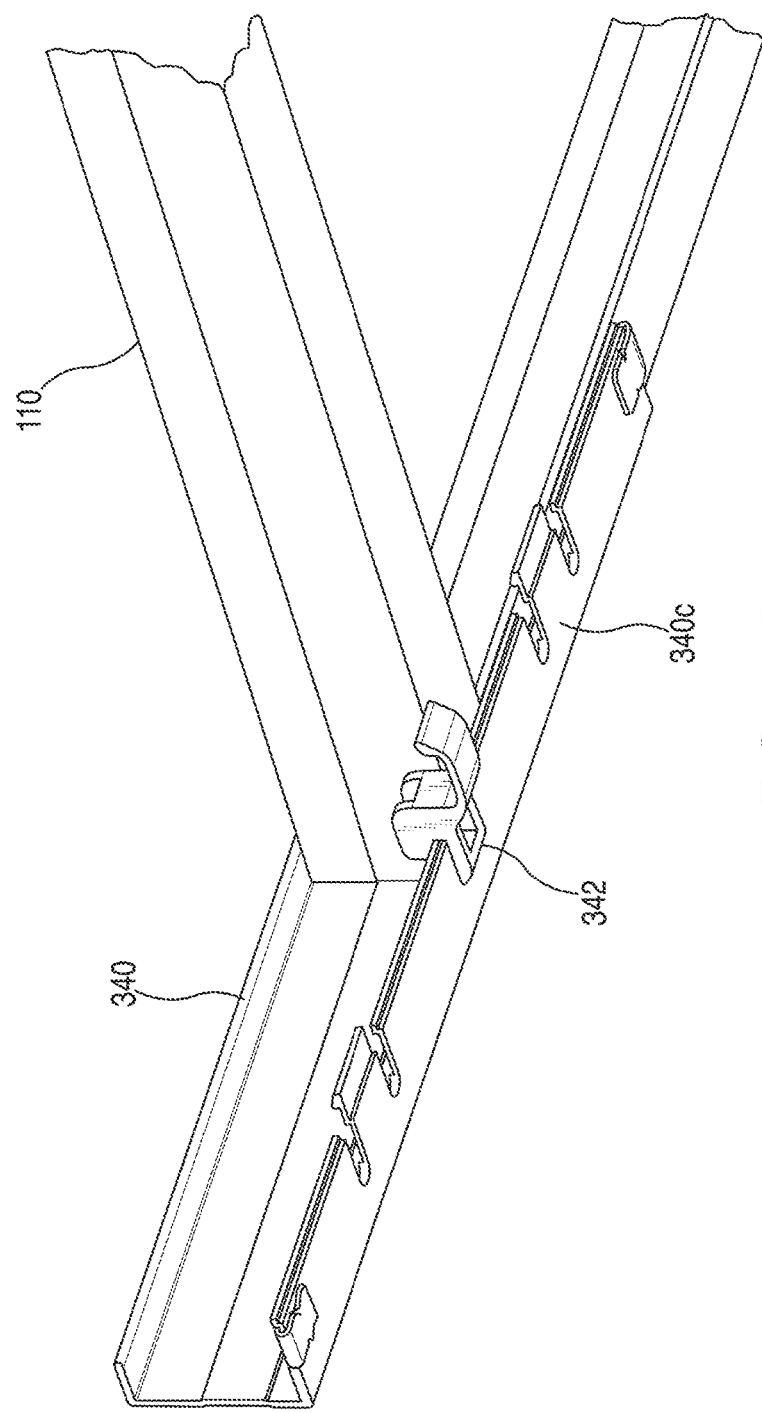

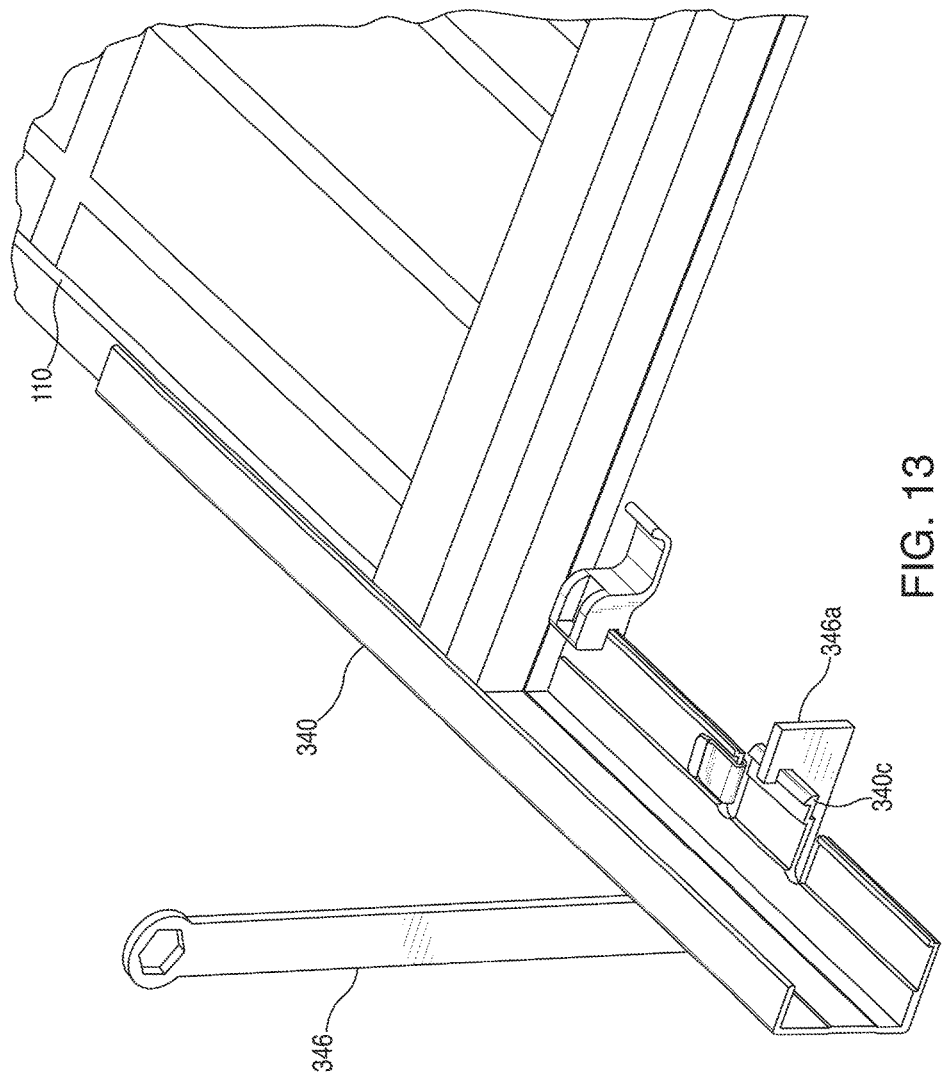

SOLAR PANEL INSTALLATION SYSTEMS AND METHODS

CROSS-REFERENCE TO RELATED APPLICATIONS

This application claims the benefit of U.S. Provisional Patent Application Ser. No. 62/033,311, entitled "Solar Panel Installation Systems and Methods," filed Aug. 5, 2014, the disclosure of which is incorporated by reference herein in its entirety; U.S. Provisional Patent Application Ser. No. 62/075,607, entitled "SOLAR PANEL INSTALLATION SYSTEMS AND METHODS," filed Nov. 5, 2014, the disclosure of which is incorporated by reference herein in its entirety; U.S. Provisional Patent Application Ser. No. 62/138,065, entitled "TILED ROOF MOUNTING SYSTEMS," filed Mar. 25, 2015, the disclosure of which is incorporated by reference herein in its entirety; and U.S. Provisional Patent Application Ser. No. 62/187,995, entitled SOLAR PANEL INSTALLATION SYSTEMS AND METHODS," filed Jul. 2, 2015, the disclosure of which is incorporated by reference herein in its entirety. This application is related to U.S. patent application Ser. No. 14/819, 397 filed Aug. 5, 2015, the disclosure of which is incorporated by reference herein in its entirety, and U.S. patent application Ser. No. 14/819,396 filed Aug. 5, 2015, the disclosure of which is incorporated by reference herein in its entirety.

BACKGROUND OF THE DISCLOSURE

Solar panel installations typically require framed solar panels, or modules, mounted on complex base structures assembled from posts, rails, clamps, and other fasteners. A significant portion of the cost of these solar panel installations may be attributed to the rails, which are often very long extruded or roll-formed members. Aside from the cost of manufacturing the rails, their considerable length can add to the cost of shipping materials to the installation site and add difficulty to the installation process. Accordingly, railless solar panel installation systems could beneficially reduce the costs of manufacturing, shipping, and installing solar panels.

SUMMARY OF THE DISCLOSURE

The solar panel installation systems disclosed herein may include an array of solar modules suspended above an installation surface using a number of height-adjustable base members. The height-adjustable base members may be attached to the installation surface and used to support the solar modules at desired levels above the installation surface.

A height-adjustable base member may include a leveling mechanism coupled to a base plate that may be affixed to the installation surface with one or more fasteners. A slidable attachment member configured to engage a lip of a solar module may be physically coupled to the top of the leveling mechanism to attach the solar modules to the height-adjustable base member.

Adjacent solar modules may be attached to one another at or near their corners using module links, thereby transforming the individual module frames into a system-wide structural members that help spread local loads throughout the system thereby reducing or eliminating the need for separate mounting rails. The module links may be attached to two or more solar modules and secured in place using mid clamps clamped between adjacent solar modules.

BRIEF DESCRIPTION OF THE DRAWINGS

For a fuller understanding of the inventive embodiments, reference is made to the following description taken in connection with the accompanying drawings in which:

FIG. 4A shows a perspective view of two adjacent edge solar modules coupled together with a module link, in accordance with various embodiments;

FIG. 12B depicts a bottom perspective view of a module link with a solar module installed, in accordance with various embodiments;

FIG. 13 shows a perspective view of a module removal tool engaged with a latching member of a module link, in accordance with various embodiments.

DETAILED DESCRIPTION OF THE PREFERRED EMBODIMENTS

Figure 1:
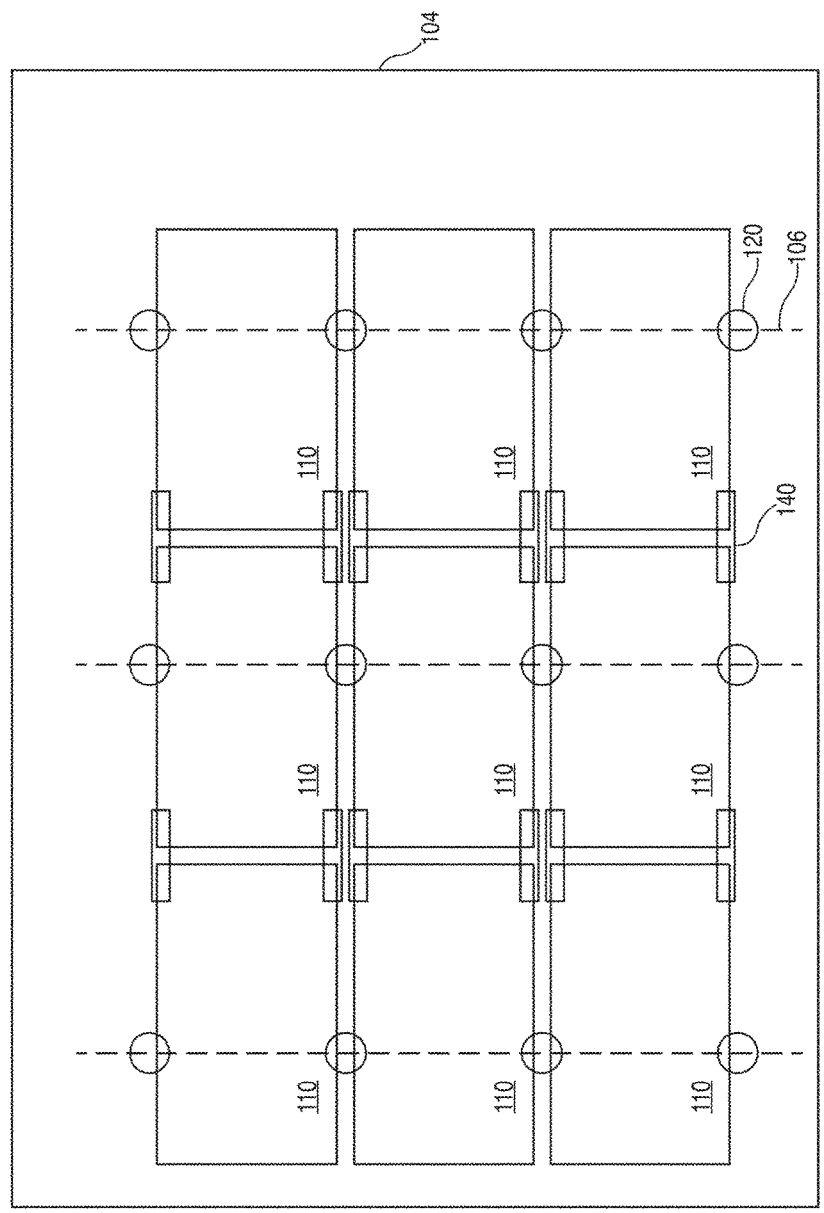
FIG. 1 shows a schematic top plan view of a solar panel installation system, in accordance with various embodiments.

FIG. 1 shows a schematic top plan view of solar panel installation system 100, in accordance with various embodiments. System 100 may include an array of solar modules 110 mounted above installation surface 102 using a number of height-adjustable base members 120. Adjacent solar modules may be coupled together at or near their corners using module links 140.

Solar modules 110 may each include an array of electricity-generating solar cells covered with a protectant material, such as tempered glass or a laminate material, for example. The array of solar cells may be supported underneath and enclosed about the perimeter with a frame. Solar modules 110 are typically rectangular-shaped structures having four corners but other shapes are possible and explicitly contemplated for use with the embodiments disclosed herein.

Solar modules 110 may be supported above installation surface 104, which may be a roof or the ground, for example, using height-adjustable base members 120. Height-adjustable base members 120 can attach to the frames of solar modules 110 at locations along their edges. Depending on environmental and regulatory requirements, a suitable number of height-adjustable base members 120 can be provided along each edge of each solar module 110. For example, a single height-adjustable base member 120 may be provided along each long edge of solar modules 110 with zero members being provided along each short edge, as shown in FIG. 1. In another example, two height-adjustable base members 120 may be provided along each long edge of solar modules 110 with one member being provided along each short edge.

Height-adjustable base members 120 may be height-adjustable in order to level the array of solar modules 110, taking into account irregularities in installation surface 104 and/or in the frames of solar modules 110. In some embodiments, height-adjustable base members 120 may also provide a tilt for the array of solar modules 110 to increase their exposure to sunlight. Height-adjustable base members 120 may also be physically coupled to installation surface 104. In some embodiments, height-adjustable base members 120 may be secured to structural members of installation surface 104, such as roof rafters 106, for example.

As depicted in FIG. 1, solar modules 110 may be arranged in a grid-shaped array with each corner solar module being edgewise adjacent to two other solar modules and diagonally adjacent to one other solar module, each non-corner edge solar module being edgewise adjacent to three other solar modules and diagonally adjacent to two other solar modules, and each interior solar module being edgewise adjacent to four other solar modules and diagonally adjacent to four other solar modules. Locations in the array where the corners of solar modules 110 are closest to one another in the array may be referred to herein as intersections.

Solar modules 110 may be attached to one another at or near their corners using module links 140. Module links 140 may attach to the frames of solar modules 110 to provide structural coupling between the any two edgewise adjacent solar modules 110 or all four adjacent solar modules at each interior intersection and between two edgewise adjacent solar modules 110 at each edge intersection. Coupling solar modules 110 together in this manner can transform the array of independent solar modules 110 into a single structural member that advantageously spreads loads throughout system 100, thereby reducing or eliminating the need for long, expensive mounting rails.

Figure 2:
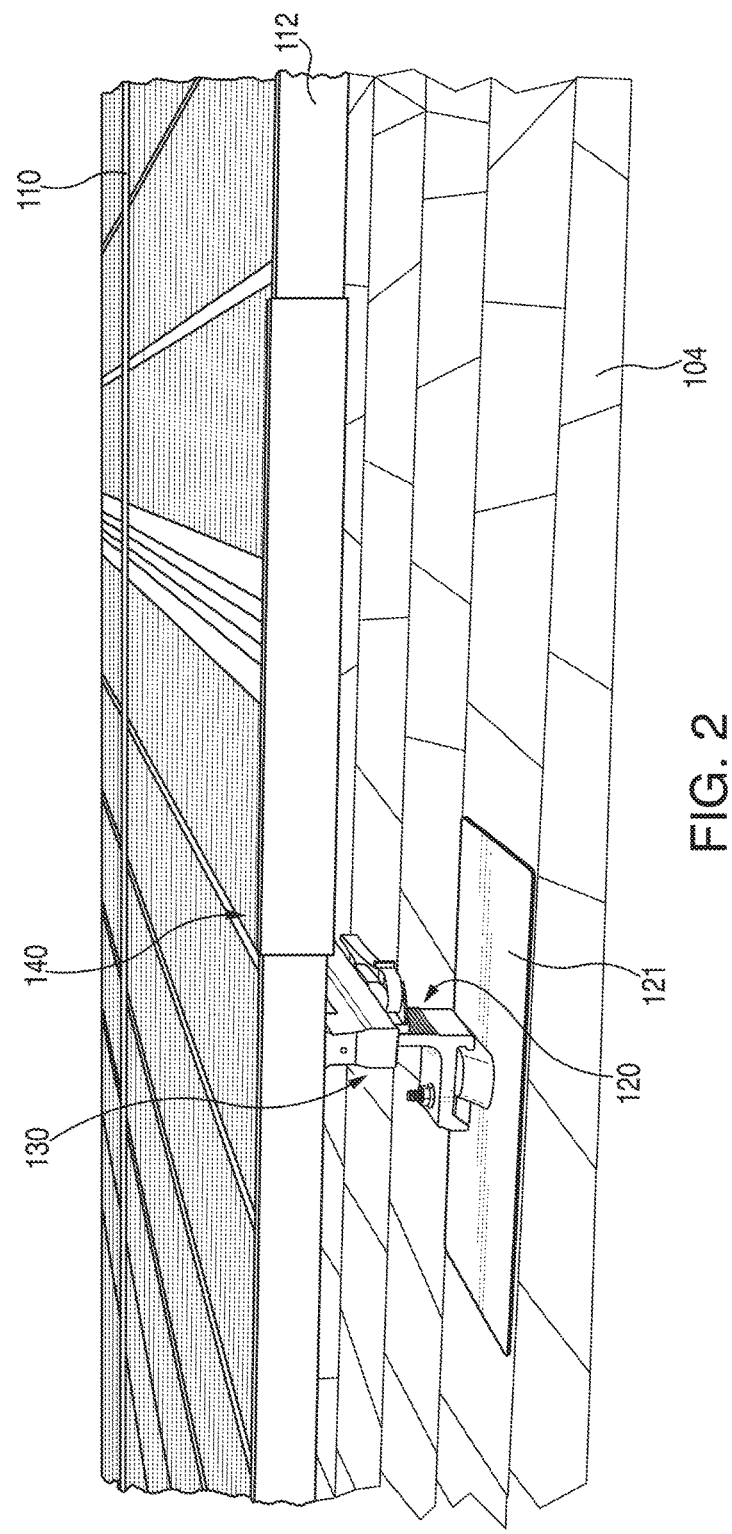
FIG. 2 shows a perspective view of a solar panel installation system, in accordance with various embodiments

FIG. 2 shows a perspective view of system 100, including solar module 110 supported by height-adjustable base member 120, in accordance with various embodiments. Height-adjustable base member is configured to be installed on an installation surface using an aperture-less flashing—namely, base plate 121. Height-adjustable base member 120 may slidably receive slidable attachment member 130, which may, in turn, slidably receive a portion (e.g., a flange) of frame 112 of solar module 110. Accordingly, height-adjustable base member 120 can support an edge of solar module 110 above the installation surface in a height-adjustable manner. Advantageously, system 100 does not require any holes to be made in the flashing, which can significantly reduce the potential for moisture to reach installation surface 104 below base plate 421 thereby eliminating a major source of leaks in commercial and residential roof-mounted solar panel installations.

Figure 3A:
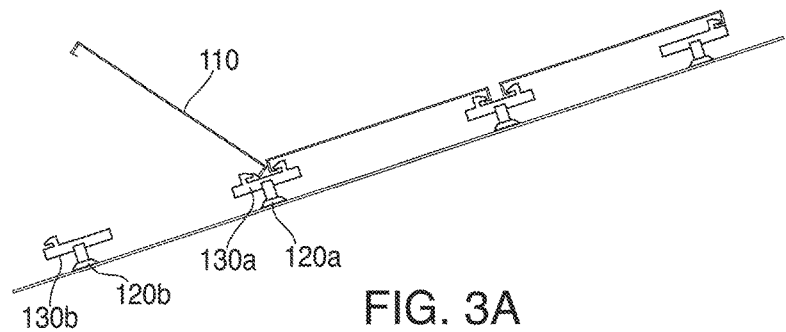
FIGS. 3A-3C show schematic cross-sectional views of a solar panel installation system, including several solar modules being mounted to an installation surface using height-adjustable base members and slidable attachment members, in accordance with various embodiments.
Figure 3B:
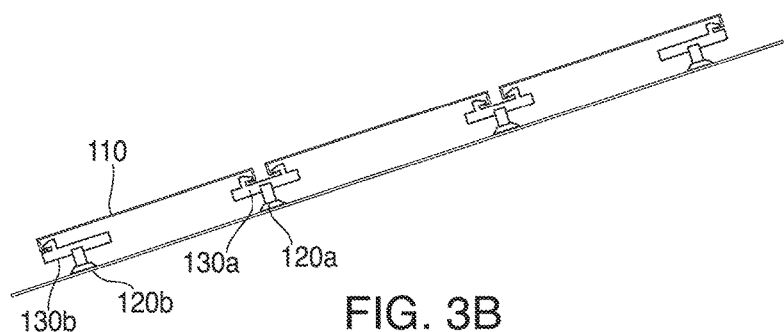
Figure 3C:
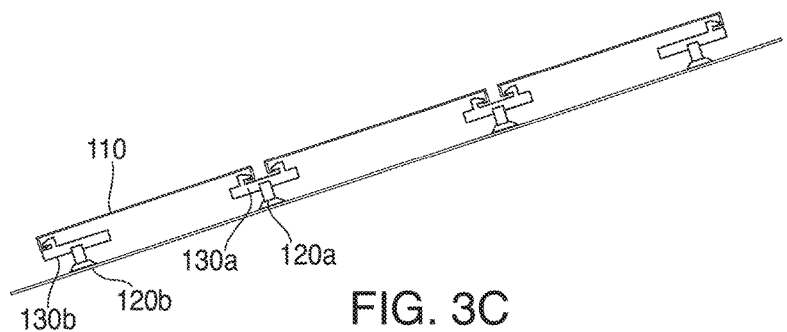

FIGS. 3A-3C show schematic cross-sectional views of system 100, including several solar modules 110 being mounted to installation surface 104 using height-adjustable base members 120 and slidable attachment members 130, in accordance with various embodiments. In particular, FIGS. 3A-3C depict a typical installation progression for system 100 in which a solar module 110 is brought into engagement with a first slidable attachment member 130a mounted above height-adjustable base member 120a, rotated down toward a second slidable attachment member 130b mounted above height-adjustable base member 120b, and the solar module 110 being locked into place by virtue of at least one component of slidable attachment member 130b retaining the frame of solar module 110. All solar modules in the array can be installed using the same general procedure.

It should be understood that while FIGS. 3A-3C depict height-adjustable base member 120 and slidable attachment member 130, the same basic installation method and module array configuration depicted here is applicable to the various height-adjustable base member and slidable attachment member embodiments disclosed in U.S. patent application Ser. No. 14/819,397 filed Aug. 5, 2015, which has been incorporated by reference herein in its entirety. Furthermore, although certain height-adjustable base members 120 and slidable attachment members 130 are depicted and described in conjunction in the following descriptions and drawings, one of skill in the art will appreciate that in some embodiments, the height-adjustable base members 120 and slidable attachment members 130 can be interchanged.

FIG. 4A shows a perspective view of two adjacent edge solar modules 110 coupled together with module link 140. Module link 140 may attach to frames 112 of and span gap 114 between edgewise adjacent solar modules 110 thereby coupling the two modules together.

Module link 140 may be clamped in position using mid clamp 142. Mid clamp 142 can include spanning member 142a, which is configured to span gap 114 and engage the top surfaces of solar modules 110, fastener 142b that may extend through an aperture in spanning member 142a and threadably engage a threaded aperture of module link 140, and spacing members 142c extending in a substantially parallel direction away from spanning member 142a on either side of fastener 142b. Spacing members 142c (shown in FIG. 5) can engage the sides of solar modules 110 to define the spacing therebetween (i.e., the width of gap 114). Tightening fastener 142b can cause spanning member 142a to clamp down on the top surfaces of solar modules 110 on either side of gap 114, and can cause module link 140 to clamp up on the bottom surfaces of solar modules 110 on either side of gap 114.

Figure 4B:
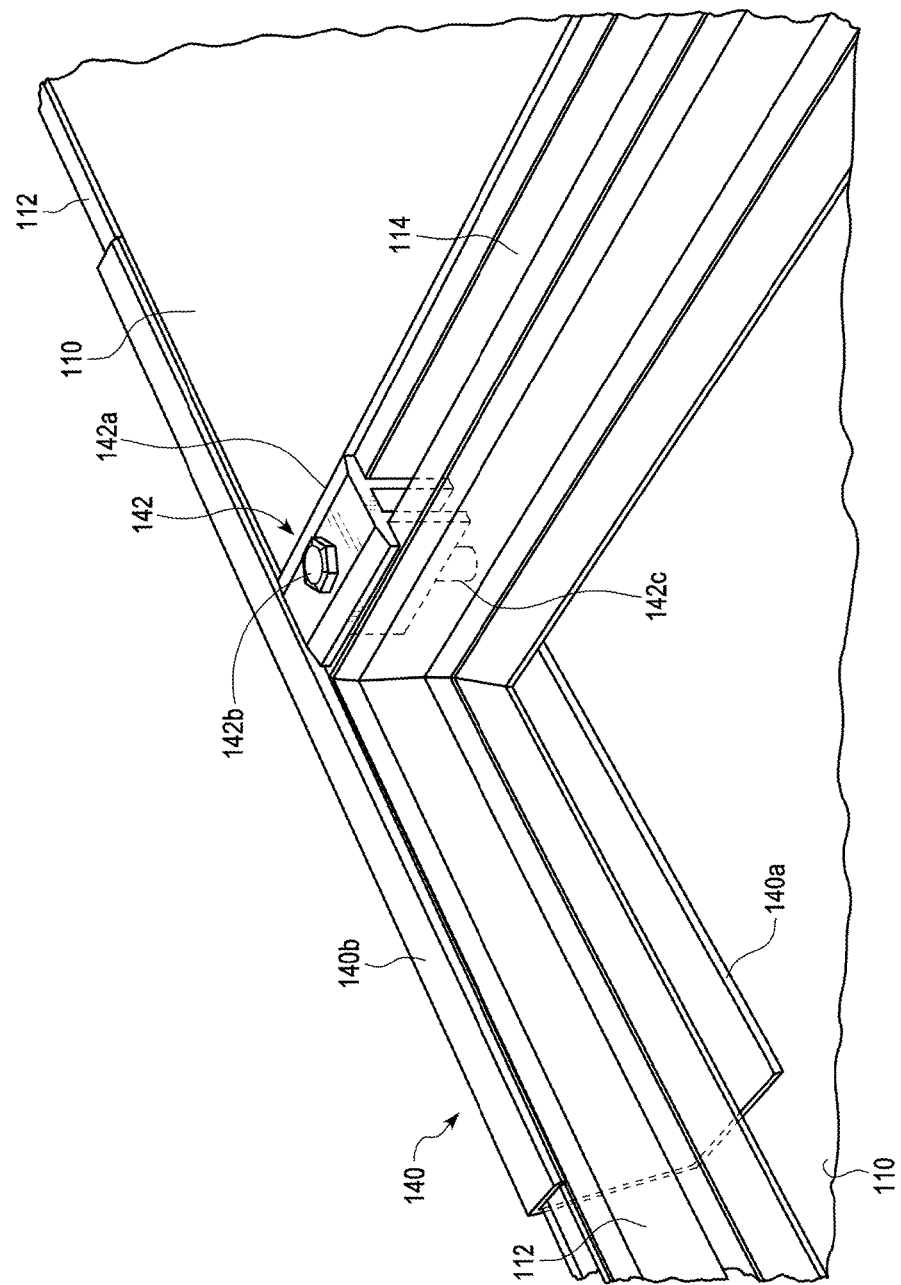
FIG. 4B shows an alternate semi-transparent perspective view of two adjacent edge solar modules coupled together with a module link 140, in accordance with various embodiments.

FIG. 4B shows an alternate semi-transparent perspective view of two adjacent edge solar modules 110 coupled together with module link 140. In particular, FIG. 4B depicts module link 140 having bottom flange 140a supporting the bottom surfaces of solar modules 110 and top flange 140b resting on the top surfaces of solar modules 110. Fastener 142b is shown extending through the aperture in top member 142a of mid clamp 142, through gap 114, and into threaded engagement with a threaded aperture in bottom flange 140a of module link 140.

Although FIGS. 4A and 4B depict module link 140 coupling together two edge solar modules 110 at an exterior intersection, it should be understood that a similar module link/mid clamp arrangement may be used to couple together two or four solar modules at an interior intersection. In embodiments in which four solar modules are coupled together at an interior intersection, a module link 150 as shown in FIG. 5 may be provided having bottom flanges 150a and top flanges 150b extending in both directions from the main body of the module link 150.

Figure 6:
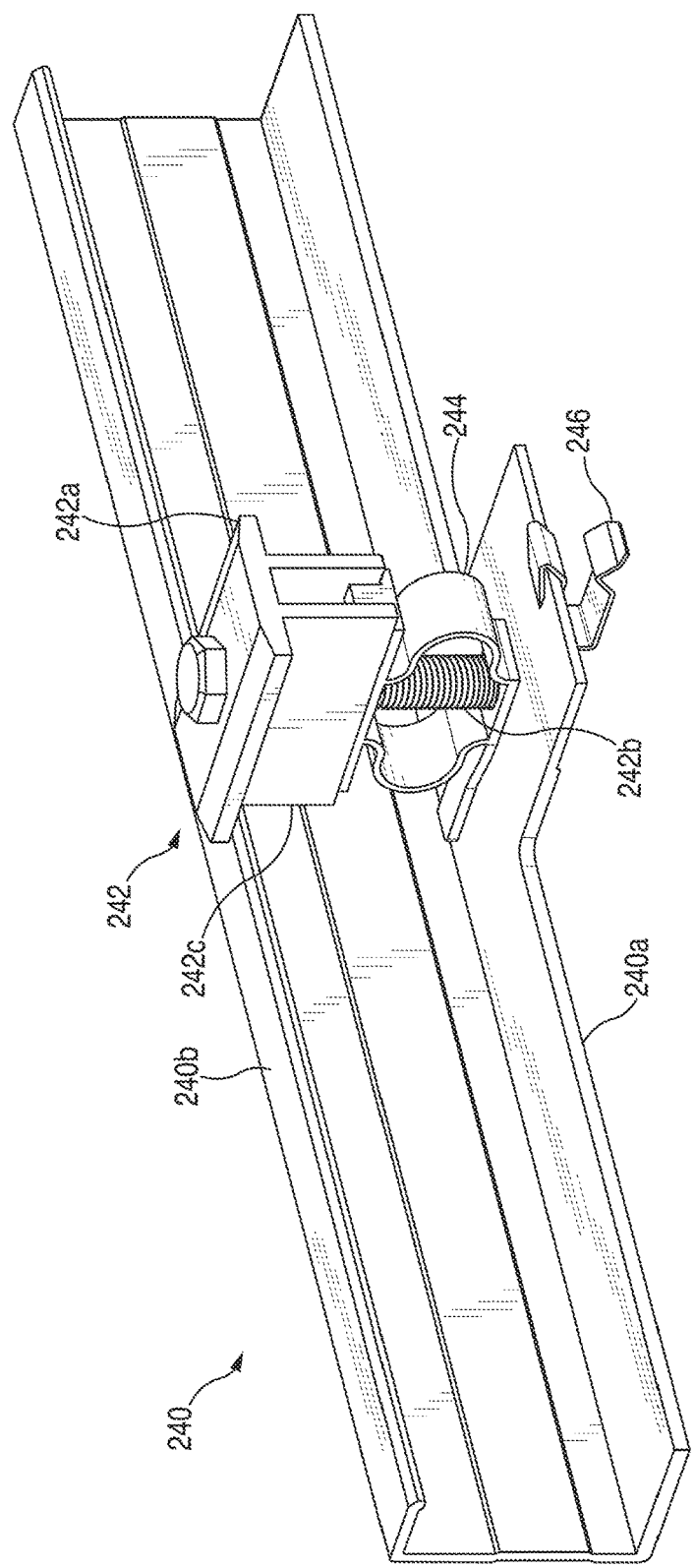
FIG. 6 shows a perspective view of another module link, in accordance with various embodiments.

FIG. 6 shows a perspective view of another module link 240, in accordance with some embodiments. Like module link 140, module link 240 may attach to frames of edgewise adjacent solar modules, such as solar modules 110, for example, thereby coupling the two modules together.

Figure 5:
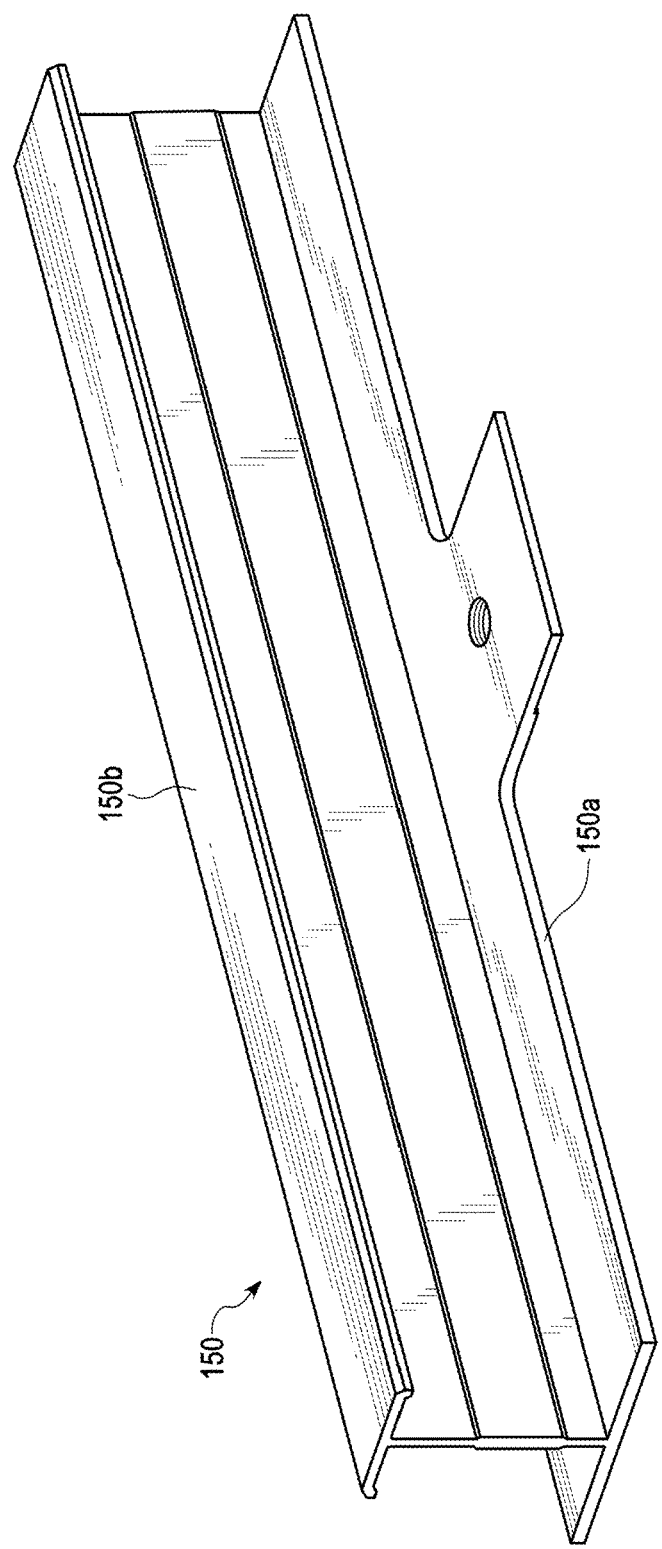
FIG. 5 shows a perspective view of a module link for coupling together four solar modules at an interior intersection, in accordance with various embodiments.

In addition to spanning member 242a, fastener 242b, and spacing members 242c, which may be similar to spanning member 142a, fastener 142b, and spacing members 142c of FIGS. 4 and 5, mid clamp 242 of FIG. 6 may include a self-aligning spring key 244. Spring key 244 can (i) prevent rotation of mid clamp 242 during installation, (ii) ensure that mid clamp 242 is centered with respect to module link 240, and/or (iii) ease installation by suspending mid clamp 242 above the top surfaces of the solar modules to be clamped. For example, mid clamp 242 may be attached to module link 240 in advance, and the entire assembly may be coupled to two solar modules by sliding bottom flange 240a under the adjacent solar modules, top flange 240b above the solar modules, spanning member 242a above the solar modules, and spacing members 242c between the solar modules. Once in place, fastener 242b can be tightened to complete the installation. One or more wire clips 246 may also be attached to module link 240 in order to manage cables running between various components of a solar panel installation.

Figure 7:
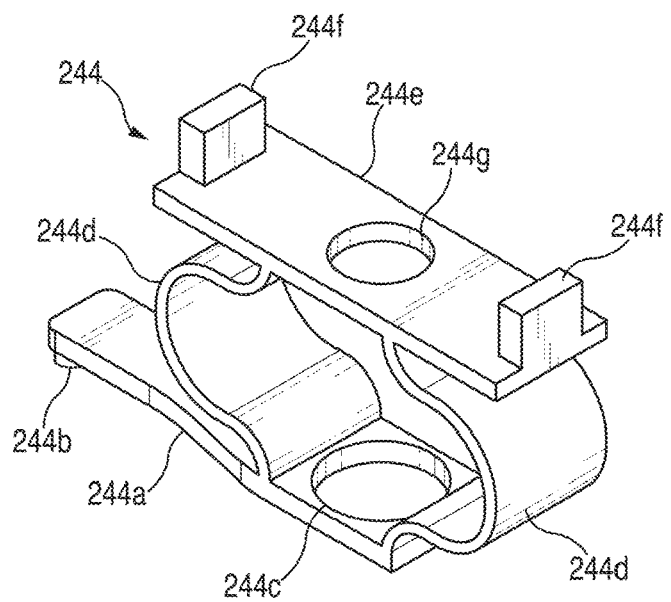
FIG. 7 shows a perspective view of a spring key, in accordance with various embodiments.

FIG. 7 shows a perspective view of spring key 244, in accordance with some embodiments. Spring key 244 can include base member 244a with a first face configured to rest upon a bottom flange of a module link (e.g., bottom flange 240a of FIG. 6). Flange 244b, which may be keyed to match, and arranged to interact with, a topological feature of the bottom flange, such as a depression, notch, aperture, or slot, for example, and may extend away from the first face of base member 244a. Base member 244a may also include aperture 244c for receiving a fastener (e.g., fastener 242b of FIG. 6). When flange 244b interacts with the corresponding topological feature of the bottom flange of the module link and the fastener is inserted through aperture 244c, rotation of spring key 244 may be prevented, thereby also preventing rotation of a mid-clamp (e.g, mid clamp 242 of FIG. 6) coupled thereto. In some embodiments, flange 244b and aperture 244c may be arranged near opposite ends of base member 244a in order to effectively prevent rotation of spring key 244.

Spring key 244 may also include compression spring elements 244d extending between a second face of base member 244a, opposite the first face, and a first face of support member 244e. Although spring elements 244d are depicted as curved walls that can flex upon a compressive force being applied to spring key 244, other types of compression springs, such as helical springs, for example, may be appropriate. In their uncompressed states, spring elements 244d may position spanning member 242a at a level that rests above the surfaces of solar modules to be clamped. Under compression, however, spring elements 244d may be compressed to allow mid clamp 242 to provide a clamping force on the solar modules. Compression of spring elements 244d may occur, for example, upon tightening of fastener 242b.

Support member 244e, which may be configured to both support mid clamp 242, can be arranged substantially parallel to base member 244a on opposite sides of spring elements 244d. To support mid clamp 242, support member 244e may be sized to engage at least a portion of spacing members 242c. That is, at least a portion of spacing members 242c of mid clamp 242 can engage and rest upon a second surface of support member 244e, opposite the first surface. In some embodiments, the outer dimensions of support member 244e may be substantially similar to the footprint of spacing members 242c as measured from a top or bottom cross-sectional elevation view of mid clamp 242.

Self-aligning members 244f may extend from a second surface of support member 244e in order to provide features to help self-align mid clamp 242 with respect to module link 240. In particular, self-aligning members 244f may be provided near either end of support member 244e and can be sized to fit between spacing members 242c with little or no play. In some embodiments, a compressible material, such as rubber or foam, for example, may be disposed between support member 244e and spacing members 242c in order to ensure a snug fit between the components. Thus, with spring key 244 being self-aligned to module link 240 by virtue of flange 244b and aperture 244c interacting with corresponding features of bottom flange 240a, and with mid clamp 242 being self-aligned to spring key 244 with self-aligning members 242f, mid clamp 242 can remain in nonrotational alignment with module link 240.

Aperture 244g, formed through spring key 244 between self-aligning members 244f, may be configured to receive fastener 242b. Accordingly, aperture 244g may be vertically aligned with aperture 244c to allow fastener 242b to pass through spring key 244 to an aperture formed in bottom flange 240a of module link 240.

Figure 8:
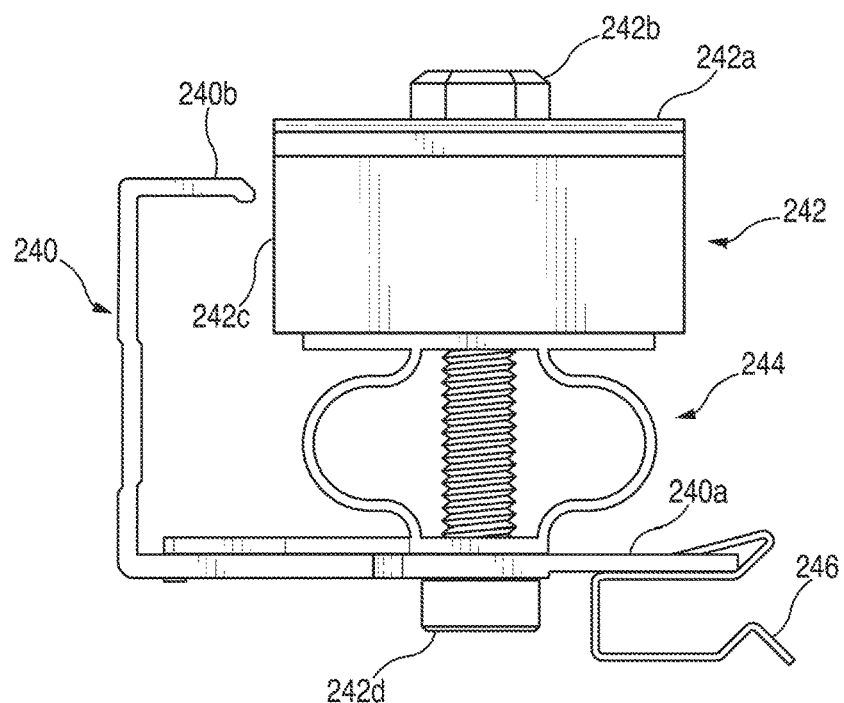
FIG. 8 shows a side view of a module link, mid clamp, and spring key, in accordance with various embodiments.

FIG. 8 shows a side view of module link 240, mid clamp 242, and spring key 244, in accordance with some embodiments. As depicted in FIG. 8, spacing members 242c can rest atop support member 244e, and fastener 242b can extend through the various aligned apertures in mid clamp 242, spring key 244, and lower flange 240a to complete the assembly. In some embodiments, the aperture of lower flange 240a and/or aperture 244c may be threaded to threadably receive fastener 242b. Additionally or alternatively, nut 242d may be provided to threadbly receive fastener 242b. In some embodiments, nut 242d may be a self-clinching nut.

Figure 9:
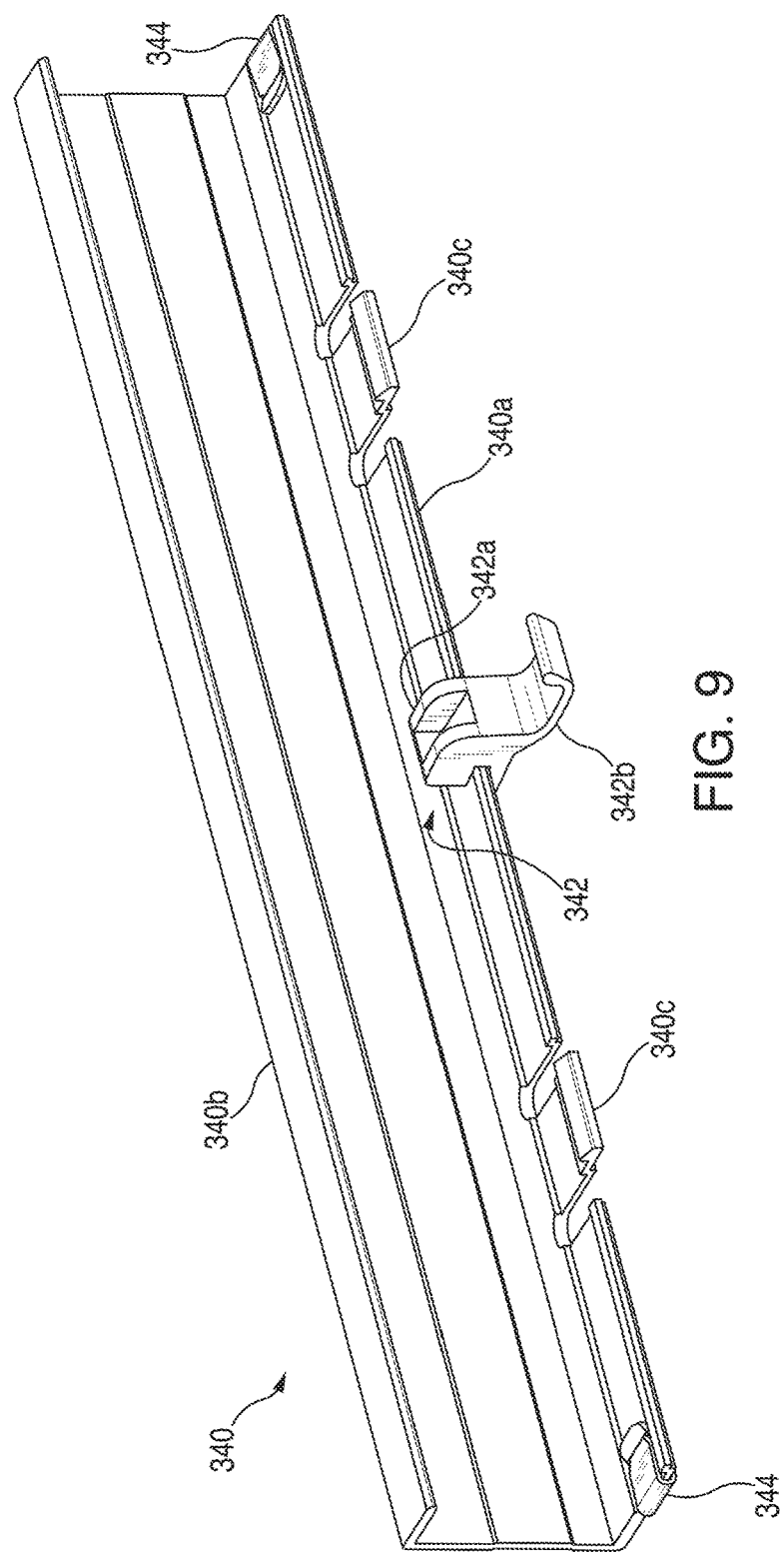
FIG. 9 shows a perspective view of a snap-on module link, in accordance with various embodiments.

In some embodiments, module links may be configured to snap onto frames 112, thereby reducing or obviating the need for clamps, such as mid clamp 142, for example, to hold the module links in place. FIG. 9 shows a perspective view of snap-on module link 340, in accordance with various embodiments. Like module links 140 and 240, module link 340 may attach to the frames of solar modules 110 to provide structural coupling between adjacent solar modules 110 in a solar installation. However, rather than coupling the module links to the modules using additional coupling components such as mid clamp 142 or 242, for example, module link 340 may use integrally formed latching members 340c to "snap" onto module frames. As used herein, the term "snap" may refer to a method of coupling together two system components with using at least one self-latching feature. Thus, the two components may be coupled together without the need for additional coupling components or tools to effectuate the coupling.

Module link 340 may snap onto one or more module frames using latching members 340c. Latching members 340c may be slightly out of plane with respect to lower flange 340a of module link 340, extending obliquely away from the installation surface, as installed. When module link 340 engages a module frame (e.g., module frame 112), latching member 340c can deflect towards the plane of lower flange 340a to allow the edge of the module frame to enter the space between lower flange 340a and upper flange 340b. As the module frame continues to enter module link 340, latching member 340c may begin to return towards its rest position by latching onto a latching feature of the module frame (e.g., a step formed in the surface of the module frame that engages latching member 340 or an edge of the module frame at the end of the surface that engages latching member 340).

Wire management spacer 342 may be coupled to lower flange 340a to ensure consistent spacing between solar modules linked together using module link 340 as well as to provide a wire management solution for the solar panel installation. Accordingly, main body 342a of wire management spacer 342 can be coupled to lower flange 340a (e.g., using one or more fasteners, adhesives, or clips) and extend away from lower flange 340a in a direction opposing the installation surface, as installed, in order to prevent adjacent solar modules linked by module link 340 from approaching one another. The width of wire management spacer 342 can, therefore, define the spacing between such adjacent solar modules. Furthermore, wire management spacer 342 can include wire clip 342b in order to manage cables running between various components of a solar panel installation in a manner similar to wire clip 246.

Module link 340 may also include anti-slip components 344 coupled to lower flange 340a. Anti-slip components 344 may be configured to permit solar modules to move with little or no resistance in a direction transverse to the longitudinal direction of module link 340. However, movement of solar modules in the longitudinal direction may be restricted by one or more anti-slip features, such as teeth running transverse to the longitudinal direction that can bite into the solar module frame to restrict its movement, for example. In some embodiments, anti-slip components 344 may also provide electrical continuity between a module frame and module link 340.

Figure 10A:
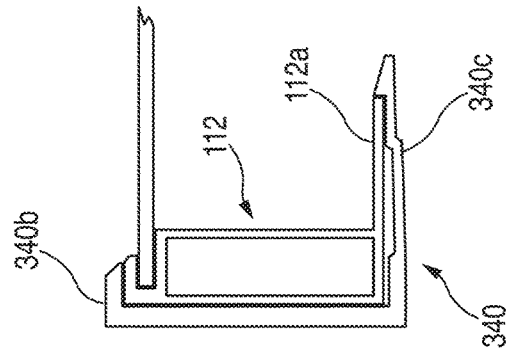
FIGS. 10A-10C show cross-sectional views of a module link in successive stages of being snapped onto a module frame, in accordance with various embodiments.
Figure 10B:
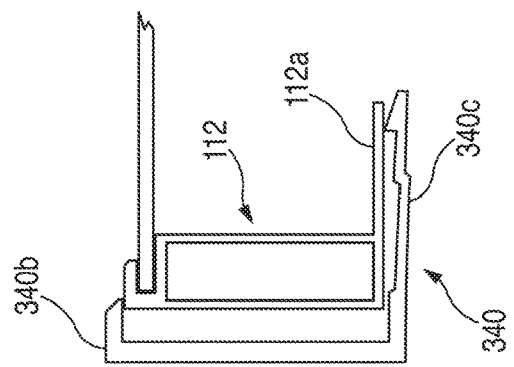
Figure 10C:
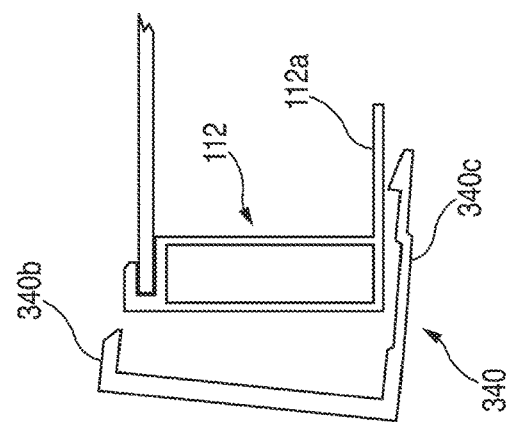

FIGS. 10A-10C show cross-sectional views of module link 340 in successive stages of being snapped onto module frame 112, in accordance with various embodiments. In FIG. 10A, module link 340 can begin to engage module frame 112 as latching member 340c extends beneath module frame 112. As engagement continues, latching member 340c can deflect to accept module frame 112 between lower flange 340a (not visible) and upper flange 340b, as depicted in FIG. 10B. When installed, latching member 340c can return towards its rest position to latch onto the edge of flange 112a of frame 112, as depicted in FIG. 10C. The distance between lower flange 340a and upper flange 340b may be slightly larger than the expected height of module frame 112 to allow for manufacturing tolerances. Furthermore, latching member 340 may include a stepped-down portion that leaves a gap between the stepped-down portion and flange 112a when module link 340 is installed. This gap may form a channel for the reception of grounding elements and/or anti-slip components 344.

Figure 11:
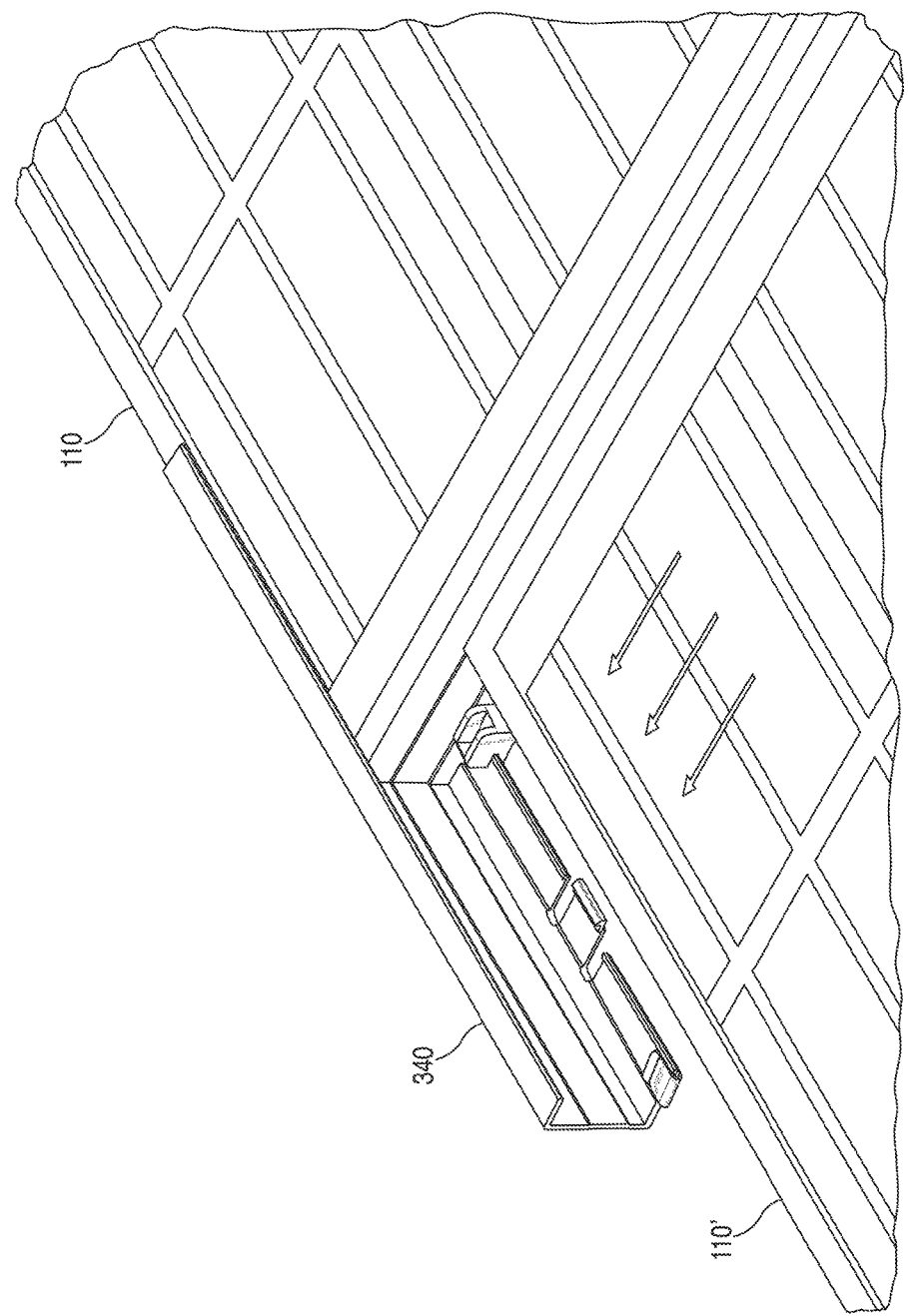
FIG. 11 depicts a perspective view a solar module being snapped into a module link, in accordance with various embodiments.

Although FIGS. 10A-10C depict module link 340 being snapped "onto" module frame 112, it should be understood that module link 340 may be snapped onto more than one module frame 112 at the same time, and that module frame 112 may also be snapped "into" module link 340. FIG. 11 depicts a perspective view of the latter installation method, in which solar module 110 is snapped into module link 340, and solar module 110' is in the process of being snapped into module link 340.

Figure 12A:
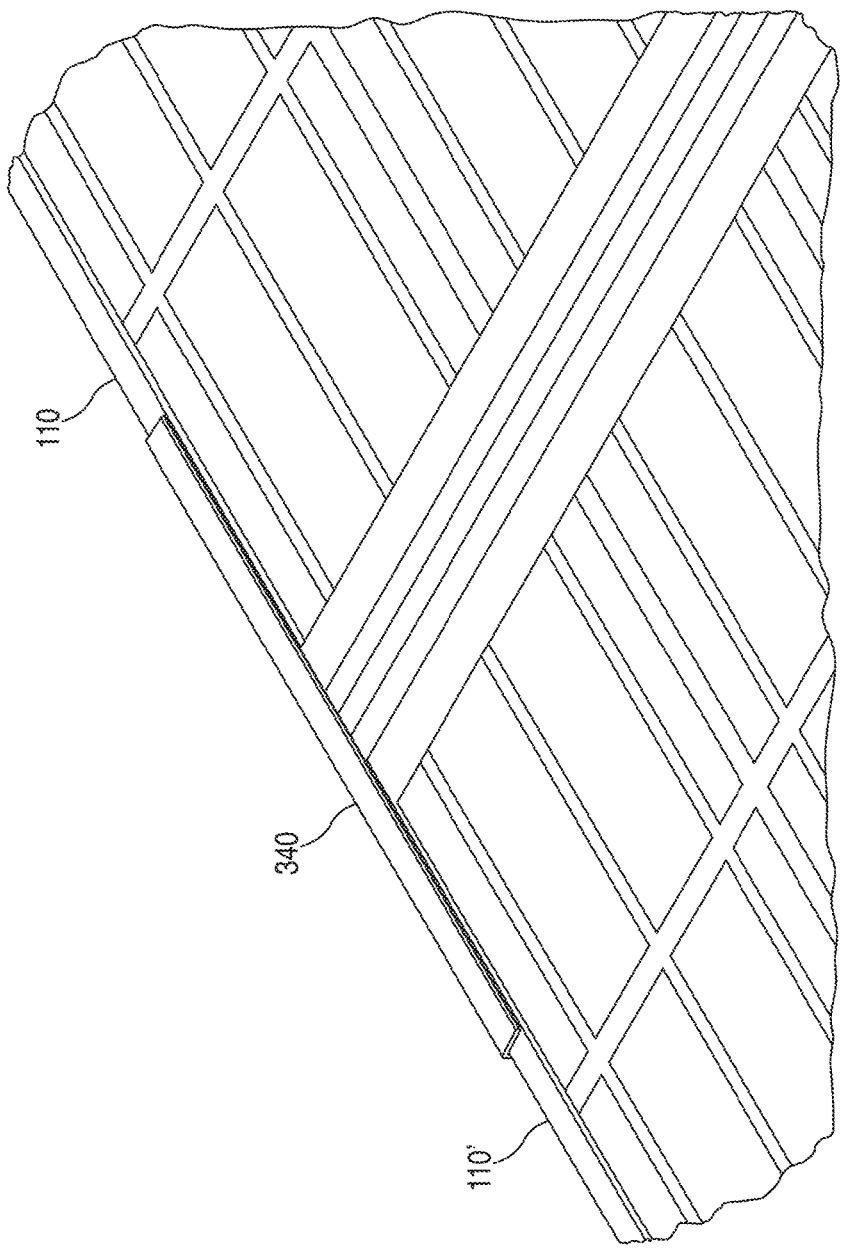
FIG. 12A depicts a top perspective view of a module link linking together two solar modules, in accordance with various embodiments.

FIG. 12A depicts a top perspective view of module link 340 linking together solar modules 110 and 100', in accordance with various embodiments. FIG. 12B depicts a bottom perspective view of module link 340 with solar module 110 installed, in accordance with various embodiments.

FIG. 13 shows a perspective view of module removal tool 346 engaged with latching member 340c, in accordance with various embodiments. Module removal tool 346 may be a generally L-shaped tool with flanged end 346a configured to engage latching member 340c beneath an installed solar module. By engaging flanged end 346a with latching member 340c, latching member 340c may be deflected towards the installation surface, thereby releasing the installed solar module.

Figure 14:
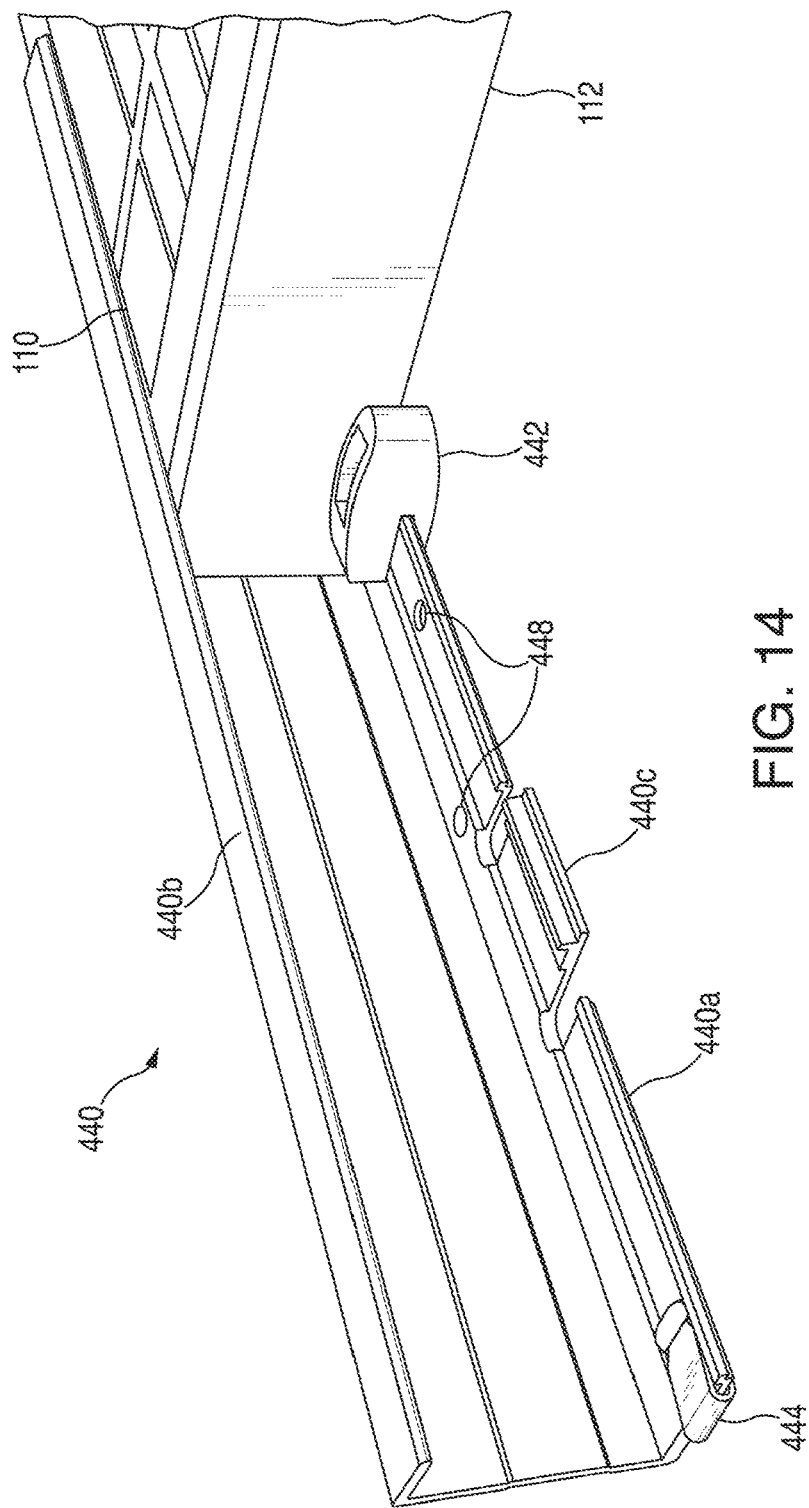
FIG. 14 shows a perspective view of another module link, in accordance with various embodiments.
Figure 15:
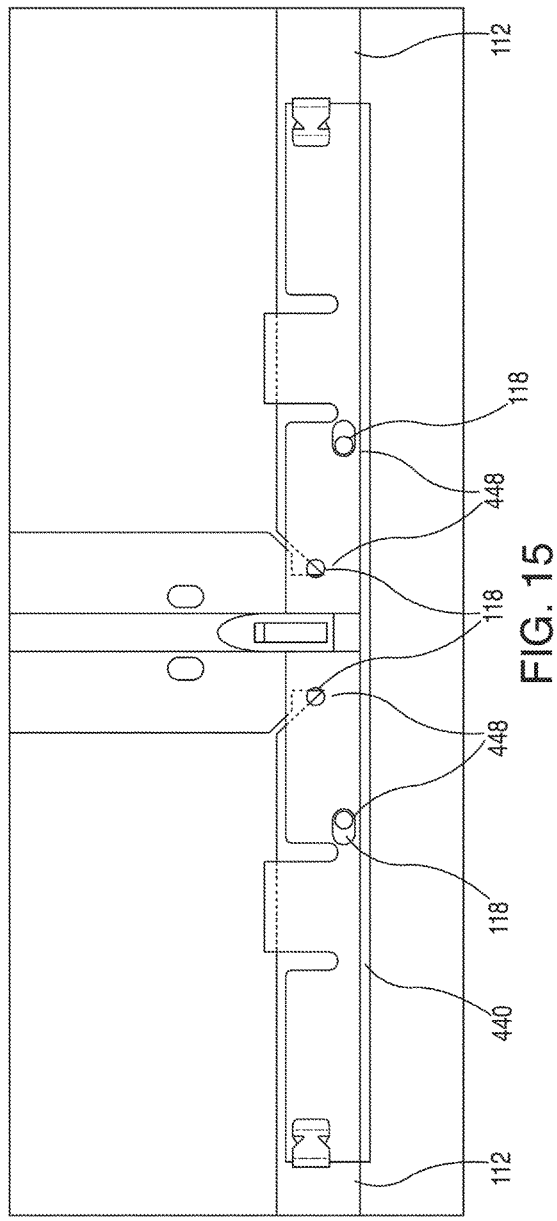
FIG. 15 shows a top plan view of drain holes of a module link aligned with drain holes of a frame 112, in accordance with various embodiments.

FIG. 14 shows a perspective view of module link 440, in accordance with various embodiments. Module link 440 is similar to module link 330 with the exception that it includes drain holes 448 configured to align with solar module frame drain holes in both portrait and landscape configurations. Aligning drain holes 448 of module link 440 with drain holes provided in frame 112 ensures proper drainage of the system, which is especially important in freezing and thawing conditions. FIG. 15 shows a top plan view of drain holes 448 of module link 440 aligned with drain holes 118 of frame 112, in accordance with various embodiments.

Figure 16:
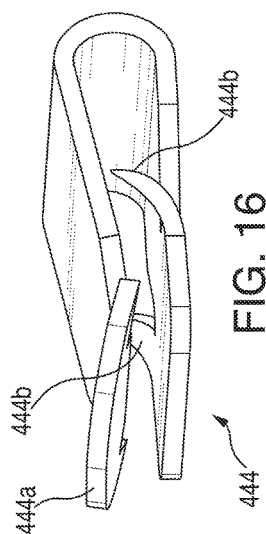
FIG. 16 shows a perspective view of a grounding clip, in accordance with various embodiments.

FIG. 16 shows a perspective view of grounding clip 444, in accordance with various embodiments. Grounding clip 444 differs from grounding clip 344 in that it includes tooth 444a that bonds to and resists movement of frame 112 of solar module 110 and teeth 444b that bond to module link 440. The bonds provide electrical continuity between frame 112 and module link 440 for the purpose of grounding system 400.

Figure 17A:
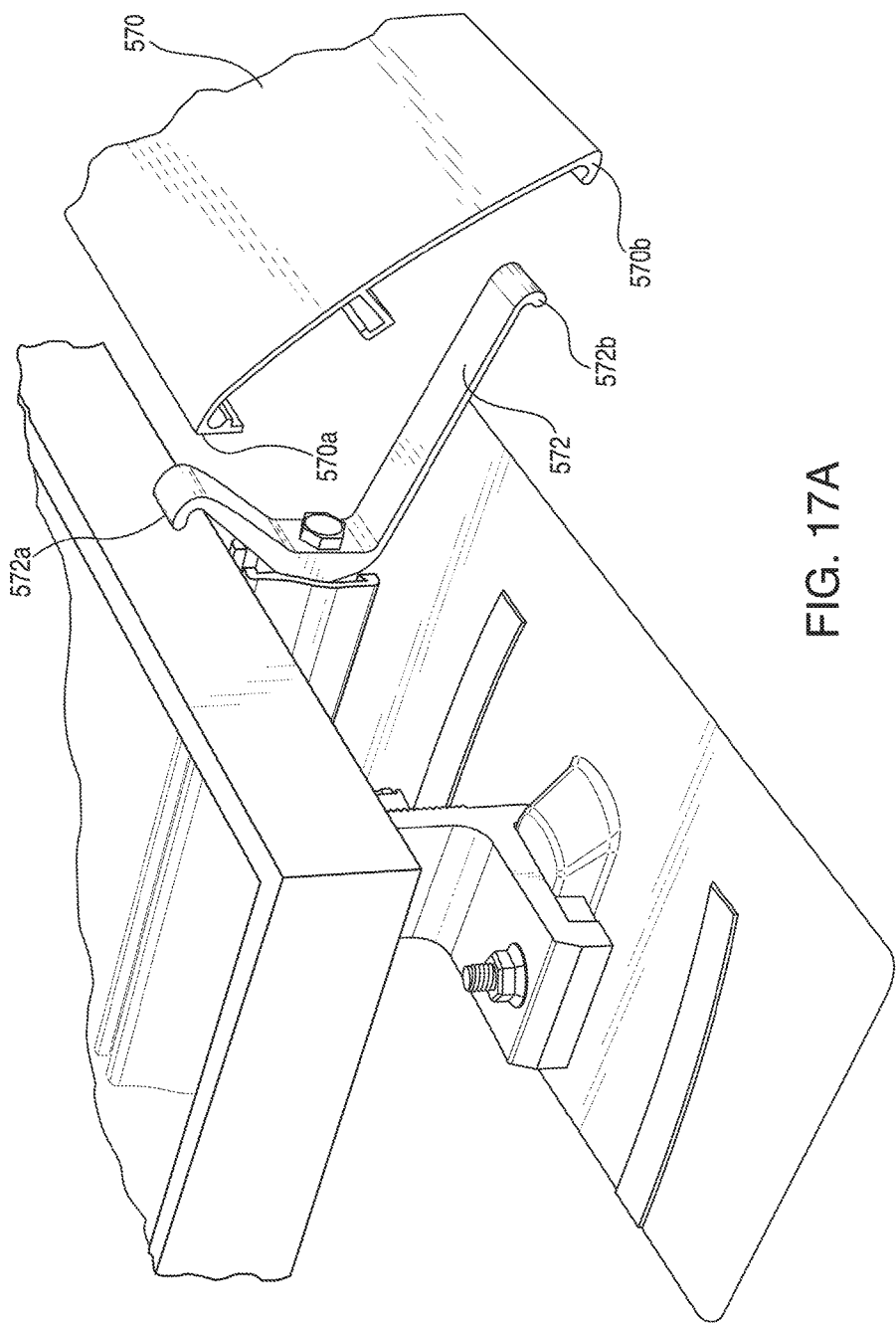
FIGS. 17A-17C show perspective views of a skirt being installed at an edge of solar module, in accordance with various embodiments.
Figure 17B:
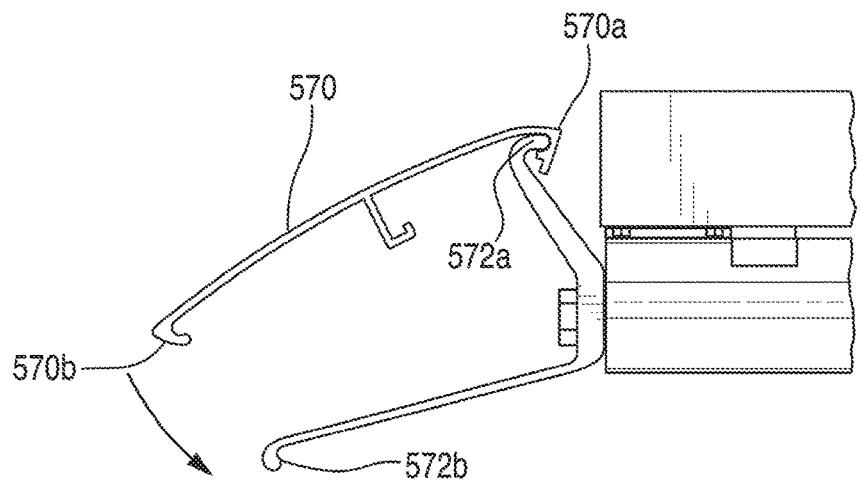
Figure 17C:
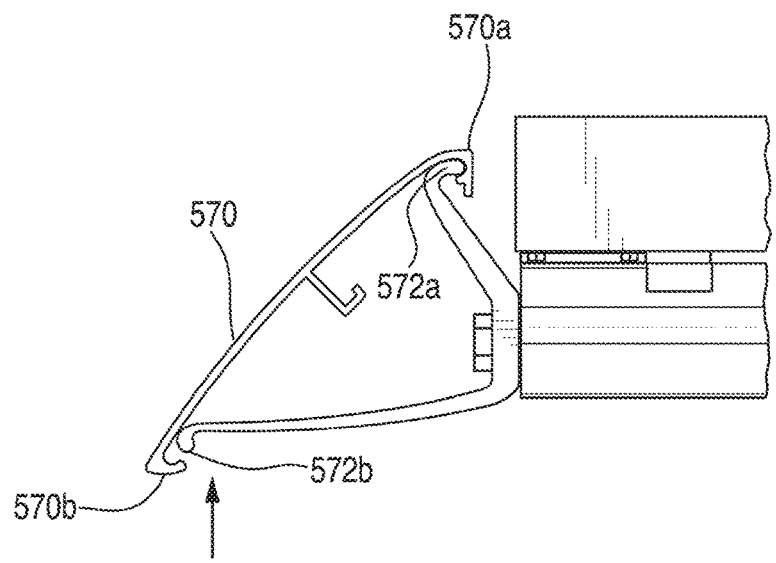

FIGS. 17A-17C show perspective views of skirt 570 being installed at an edge of solar module 110, in accordance with various embodiments. Skirt 570 can enhance the aesthetics of the systems disclosed herein by providing a finished look at visible edges of the solar module array. Skirt 570 can also disrupt and/or reduce the amount of wind flowing under the array to reduce undesirable up-forces on the modules of the array. Skirt 570 may be attached to a slidable attachment member rail (e.g., rail 232, 332, or 432) with rail clip 572. Rail clip 572 can include upper flanged member 572a designed to mate with complementary upper flanged member 570a of skirt 570 and lower flanged member 572b designed to mate with complementary lower flanged member 570b of skirt 570. FIGS. 17B and 17C illustrate how upper flanged member 572a and lower flanged member 572b deflect towards one another to engage complementary upper flanged member 570a and complementary lower flanged member 570b, respectively, and thereafter hold skirt 570 in place via a spring force resulting from the deflected flanged members.

Figure 18:
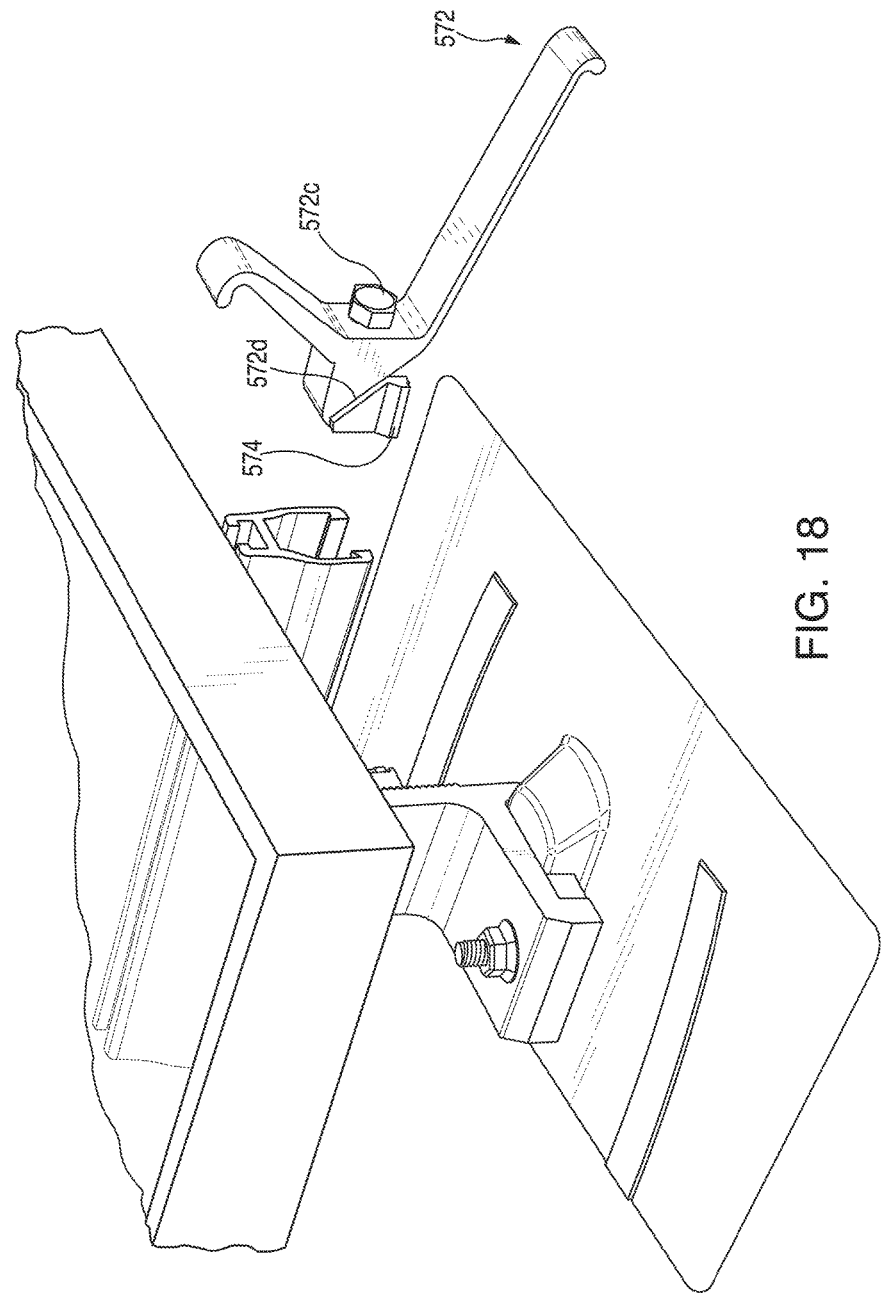
FIG. 18 shows a perspective view of a rail clip, in accordance with various embodiments.

FIG. 18 shows a perspective view of rail clip 572, in accordance with various embodiments. Rail clip 572 may be retained within the channel of a rail using a wedged coupling assembly as shown in FIG. 18. As fastener 572c is tightened, wedge 574 slides against sloped surface 572d and moves in a direction toward the installation surface and presses against flanges disposed at the distal end of the channel, thereby locking rail clip 572 into place inside the channel.

Figure 19:
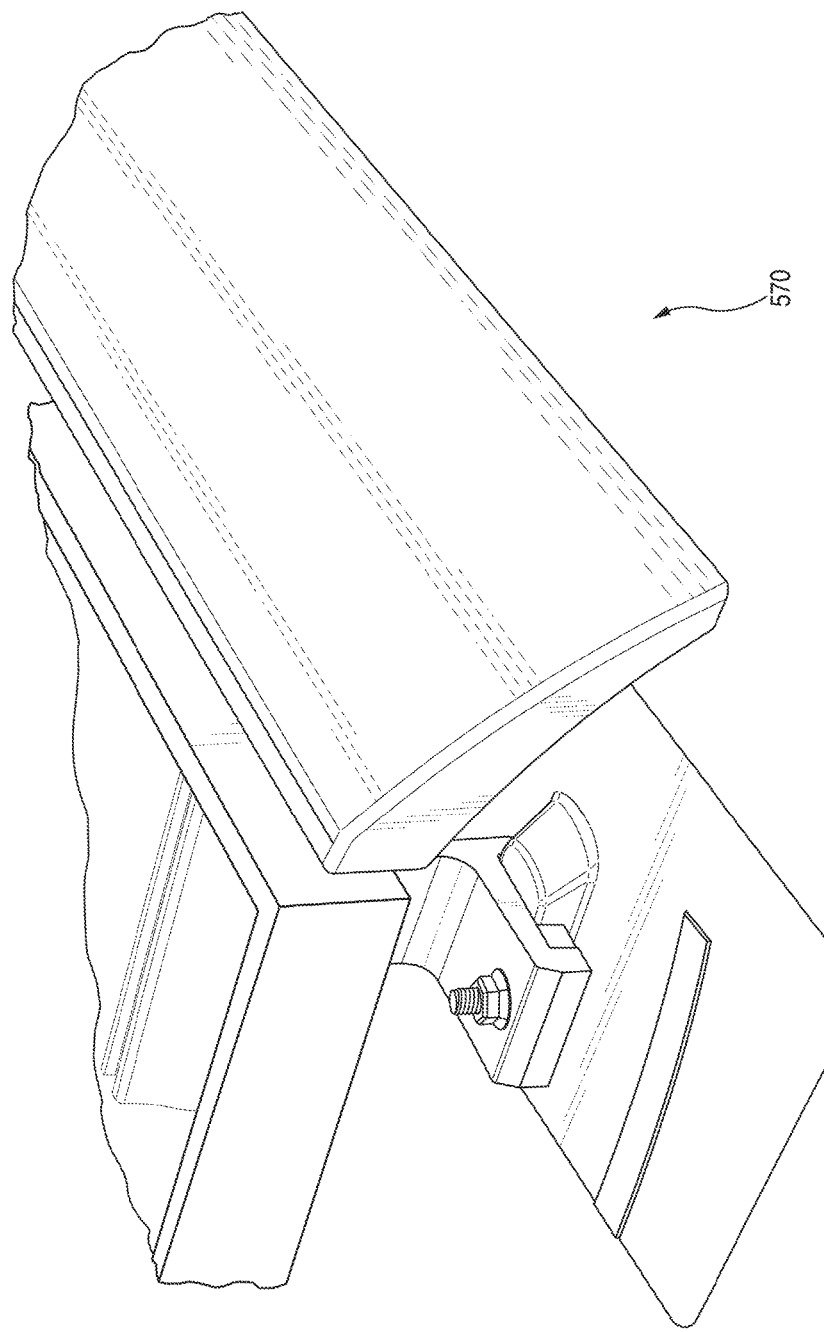
FIGS. 19 and 20 show perspective views of a skirt installed at the edges of a solar module, in accordance with various embodiments.
Figure 20:
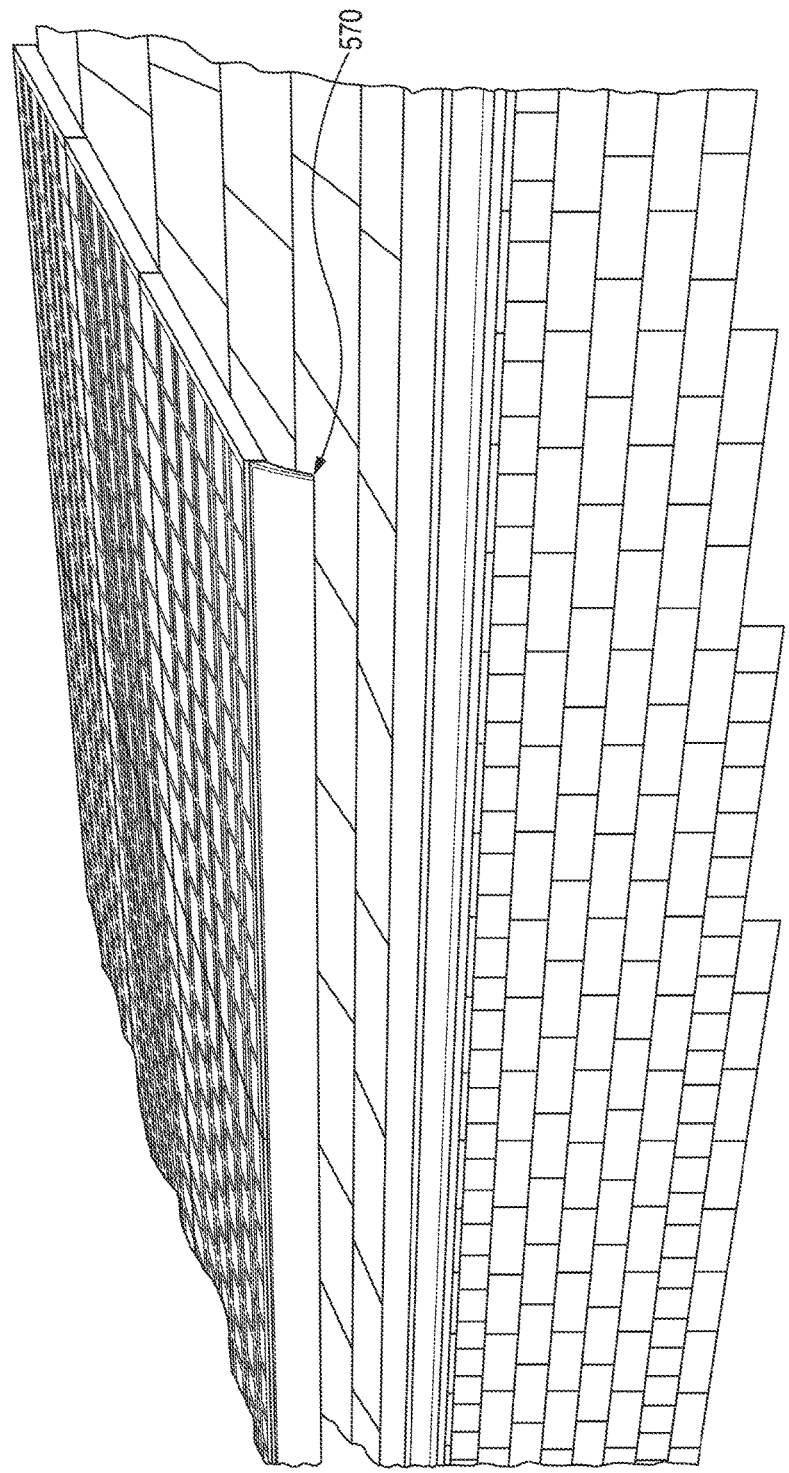

FIGS. 19 and 20 show perspective views of skirt 570 installed, in accordance with various embodiments.

Figure 21:
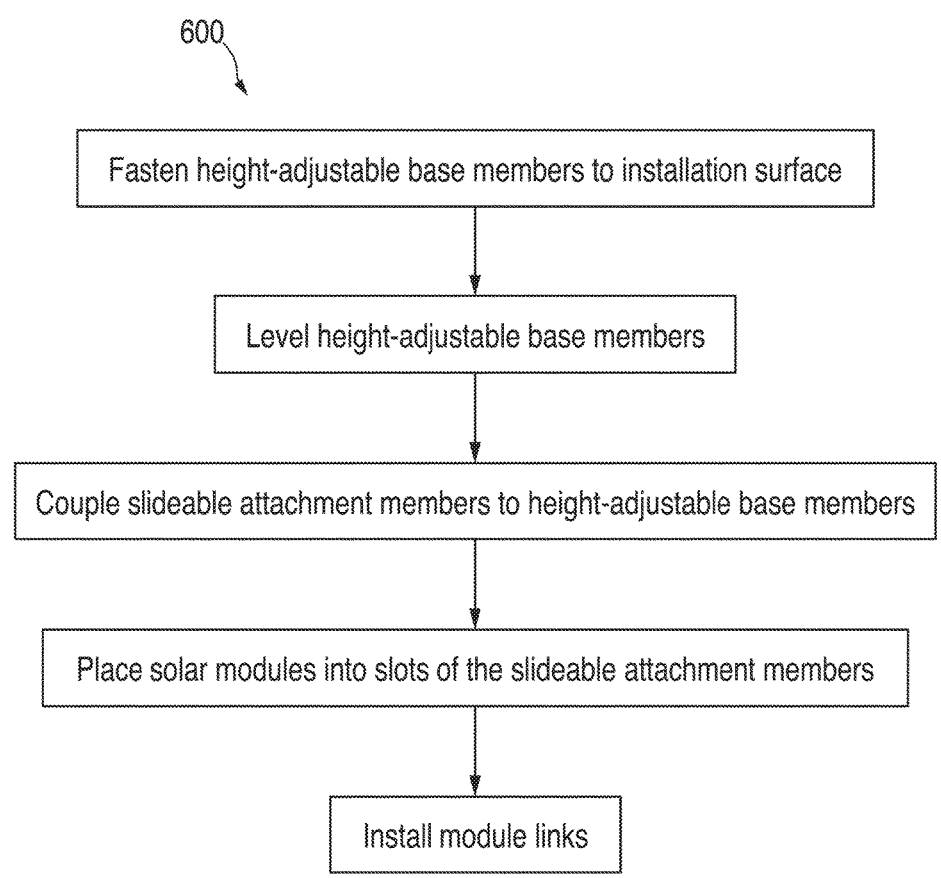
FIG. 21 shows a flowchart of an exemplary process for assembling a solar panel installation, in accordance with some embodiments.

FIG. 21 shows a flowchart of an exemplary process 600 for assembling a solar panel installation, in accordance with some embodiments.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A solar panel system, comprising:
 a plurality of solar panels, each solar panel comprising at least one solar module;
 a plurality of integrally formed, unsupported module links structurally coupling together edgewise adjacent solar panels of the plurality of solar panels, each integrally formed, unsupported module link comprising:
  a main body;
  a top flange extending substantially perpendicularly from the main body at least partially over a top portion of a frame; and
  a bottom flange extending substantially perpendicularly from the main body at least partially under a bottom portion of the frame; and
 a plurality of mid-clamps, each mid-clamp comprising:
  a spanning member that extends over the top portions of two corresponding frames of the plurality of solar panels, the spanning member comprising an aperture;
  spacing members extending substantially perpendicularly from the spanning member between the two corresponding frames; and
  a fastener extending through the aperture and into an aperture in the bottom flange of one of the plurality of the integrally formed, unsupported module links, wherein tightening the fastener causes the spanning member to bear down on the top portions of the two corresponding frames and causes the bottom flange to bear upwardly on the bottom portions of the two corresponding frames.

2. The solar panel system of claim 1, wherein a subset of the plurality of integrally formed, unsupported module links comprises:
 a second top flange extending from the main body in a direction opposite the top flange; and
 a second bottom flange extending from the main body in a direction opposite the bottom flange.

3. The solar panel system of claim 2, wherein the top flange and bottom flange couple together a first set of two edgewise adjacent solar panels, and wherein the second top flange and the second bottom flange couple together a second set of two edgewise adjacent solar panels.

4. The solar panel system of claim 1, wherein the mid-clamp further comprises a self-aligning spring key comprising:
 a base member in keyed engagement with the bottom flange;
 a support member in engagement with the spacing members;
 self-aligning members extending away from the support member between the spacing members; and
 a compression spring between the between the base member and the support member.

5. The solar panel system of claim 4, wherein the base member and the support member each comprises an aperture for receiving the fastener.

6. The solar panel system of claim 1, wherein the bottom flange comprises at least one latching member.

7. The solar panel system of claim 6, wherein each latching member is integrally formed with the module link and snappingly couples to the bottom portion of the frame.

8. The solar panel system of claim 6, further comprising:
 a spacer coupled to the bottom flange positioned between edgewise adjacent solar panels.

9. The solar panel system of claim 8, wherein the spacer comprises a wire clip for receiving and routing cables of the solar panel system.

10. The solar panel system of claim 1, wherein:
 each frame comprises a plurality of frame drain holes;
 each module link comprises a plurality of module link drain holes; and
 at least one of the module link drain holes is aligned with at least one of the frame drain holes.

* * * * *